June 11, 1963   E. D. BESSER   3,093,523
PROCESS FOR MAKING EXTRUDABLE PROPELLANT
Filed Oct. 24, 1955   2 Sheets-Sheet 2
Fig. 2.
Fig. 3.
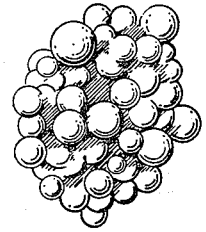
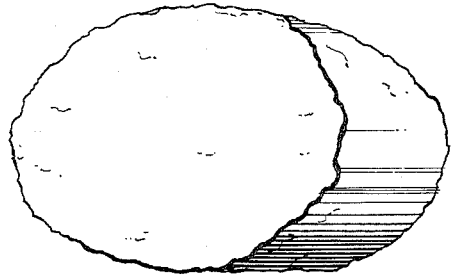
Fig. 4.
INVENTOR.
ELI D. BESSER
BY
ATTORNEYS

United States Patent Office 3,093,523
Patented June 11, 1963

3,093,523
PROCESS FOR MAKING EXTRUDABLE PROPELLANT
Eli D. Besser, China Lake, Calif., assignor to the United States of America as represented by the Secretary of the Navy
Filed Oct. 24, 1955, Ser. No. 542,530
1 Claim. (Cl. 149—98)
(Granted under Title 35, U.S. Code (1952), sec. 266)

The invention described herein may be manufactured and used by or for the Government of the United States of America for governmental purposes without the payment of any royalties thereon or therefor.

This invention relates to a process for the preparation of double-base propellent compositions in a granular form which may be extruded by conventional extrusion techniques, more particularly, it relates to a process for the preparation of nitrocellulose-nitroglycerin base propellent compositions in an extrudable form.

The extensive development of double base mesa and plateau type propellants for use in jet actuated devices emphasizes the need for a suitable process for the manufacture of propellant grains from these propellants in sizes ranging from ½ inch or less in diameter to diameters as large as 30 inches. By "propellant grain" is meant a cylinder of propellent composition which may vary in diameter from ½ to 30 inches and in length from 1 to 100 inches or more. As is well known, the mesa and plateau type properties of these propellants are highly sensitive to even minor changes in the percentage composition of the propellant. Accordingly, any process for the manufacture of grains from these compositions must not appreciably alter the percentage composition of the starting materials of the propellant. An optimum process for the manufacture of suitable grains from propellent compositions would be a screw extrusion technique in which the propellent composition in a flowable form is introduced into a hopper and the product extruded by screw extrusion into suitable grains. To feed properly in a continuous screw extruder, the granules of propellent composition must be in a size range and shape to flow freely into the extruder barrel. When extruded, the granules must completely lose their identity as individual particles and consolidate into homogeneous propellant grains having the desired ballistic properties.

The present method of manufacturing small diameter nitroglycerin base propellant grains comprises the slurry mix, hot rolling process. This process involves mixing nitroglycerin and other ingredients, with nitrocellulose in a water slurry. The mixture, after filtration to remove most of the water, aging, and drying, is rolled on hot differential rolls to produce a colloiding effect and to obtain a homogeneous propellant mass in the form of sheets. The sheets are diced and the product dry extruded into the desired shape and size. This process has the disadvantages that it is time consuming, the composition must be rolled on hot differenial rolls to produce the colloiding action, and the sheets must be diced into the proper size particles to permit extrusion into propellant grains. For very large grains, such as 30 inches in diameter, a casting process must be used as extrusion processes cannot be used practicably to form a grain of this size. According to the casting process, nitroglycerin and other plasticizers which act as solvents for nitrocellulose, are added to a mold containing solid balls consisting of nitrocellulose and other ingredients. The mixture is held at an elevated temperature for several hours during which the ingredients coalesce into a uniform product. This procedure is also time consuming.

In the above described casting process the solid balls of nitrocellulose are made in accordance with the process essentially as described in U.S. Patent No. 2,027,114. The process described in this patent is essentially the "ball powder" process widely used in industry. This process was investigated as a possible expedient for preparing propellent compositions in the desired extrudable form. According to the process, powder ingredients are dissolved in a volatile solvent to form a lacquer. The insoluble lacquer is then dispersed into small globules by agitation in water. When the solvent is distilled off, small hard balls of powder are formed. A disadvantage of this method for forming propellant grains is that the product formed is not extrudable due to the fact that a hard shell is formed on the individual particles which prevents colloiding or consolidation upon extrusion. For the same reason the process is not entirely satisfactory for producing propellent compositions for casting propellent grains. The minimum amount of solvent required for this process is at least three times the weight of the propellant, thus creating a problem of solvent removal. The process requires a long formation time, high temperatures and a salting out step to remove water and increase the specific gravity of the particles. Some of these factors contribute to the formation of denatured and denitrated surfaces on the ball powder which are insolubilized so that the hard skin mentioned above is formed, thus preventing colloiding and making extrusion of the balls into finished propellant grains impossible. It is well known that reducing the nitrogen content of nitrocellulose in lacquers results in the formation of a tougher product. A further disadvantage of the above and other prior processes is that the content of the ballistic modifier lead compound is often reduced below that necessary to produce the required mesa or plateau characteristic of the propellant.

It is therefore an object of this invention to provide a process for the preparation of nitrocellulose-nitroglycerin base propellent compositions in a granular form which can be consolidated by extrusion into propellant grains of various sizes.

It is another object of this invention to provide a process for the manufacture of extrudable double base propellent compositions which is safe in operation, and which does not require a prohibitive amount of solvent.

It is a further object of this invention to provide a method for producing extrudable, double bare propellent compositions which does not appreciably affect the percentage compositions of the starting materials.

In its broadest sense the invention comprises the homogeneous mixing of the propellent ingredients by the addition of a liquid mixture of the components, with the exception of nitrocellulose, to a water slurry of nitrocellulose, followed by the addition of solvent, in contrast to prior processes in which solvent was introduced to form a lacquer before the introduction of water. A feature of the process comprises the procedure by which particles of ballistic modifiers are protected from the solublizing effect of water and other solvents by mixing the ingredients in such a manner that an oily coat of nitroglycerin and other components of the propellent composition are formed over the particles. This procedure comprises forming a mixture of nitroglycerin and the remaining ingredients before introduction into the nitrocellulose-water slurry. The nitroglycerin is desensitized by mixing it with a portion of the inert plasticizer. A paint paste which consists of the remainder of the inert plasticizer and the conventional modifiers and stabilizers for double base propellants is made by grinding these ingredients together. The paint paste and desensitized nitroglycerin are thoroughly mixed and introduced into the nitrocellulose-water slurry. The water-immiscible solvent is then added to the propellant-water slurry, preferably, in less than a 3 to 1 weight ratio of solvent to propellant. The formed mixture is aged for approximately two hours, the solvent removed, excess water filtered off from the mixture, and the formed granular powder dried.

The invention is best understood by reference to the following explanation taken together with the accompanying drawings hereby made a part of this application and in which;

FIG. 2 is a showing of individual discrete particles of propellent composition formed by the process of the invention;

FIG. 3 is a showing of a sampling of a propellent composition made by a conventional solvent process, and FIG. 4 is a cross-section of a grain extruded from the propellent composition shown in FIG. 2.

Figure 1:
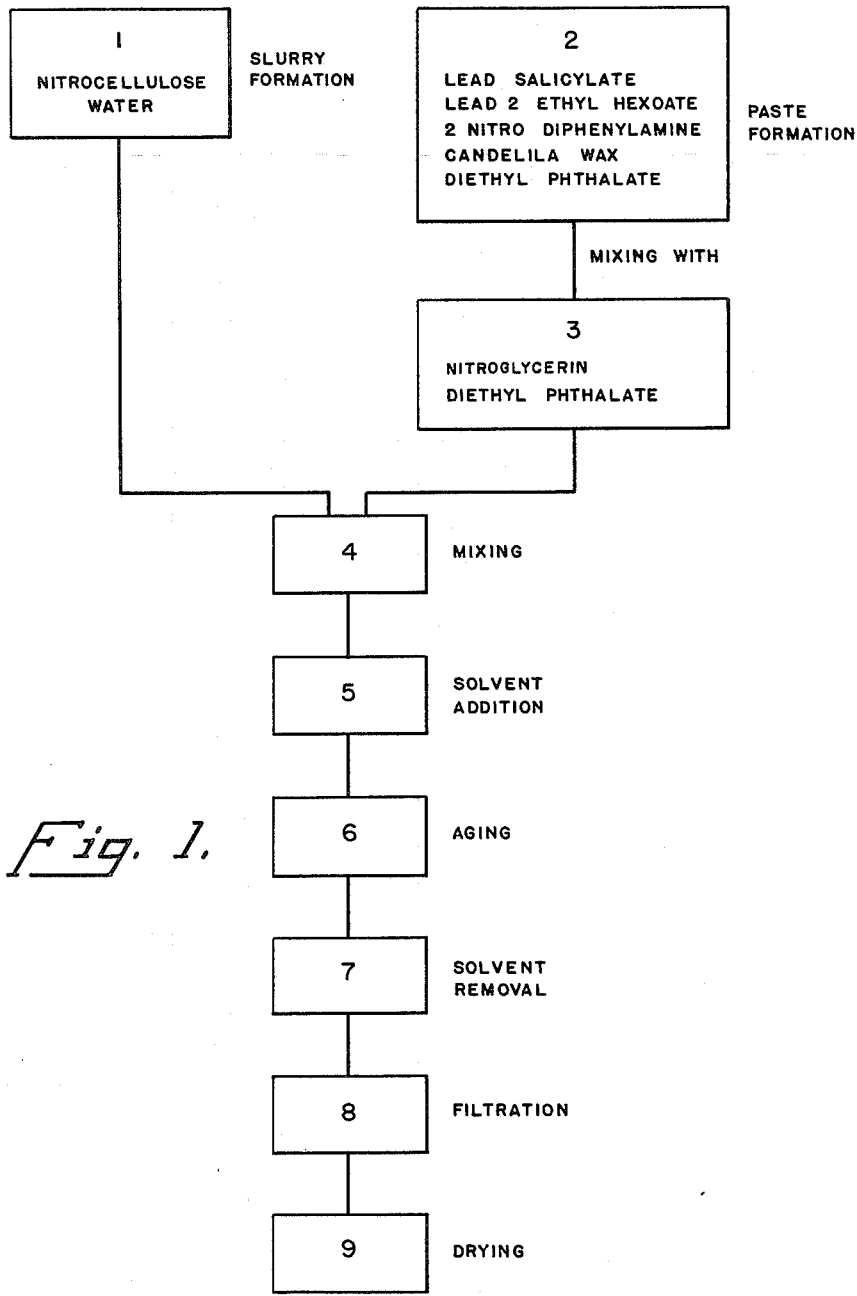
FIG. 1 is a flow diagram of the process of the invention.

The invention is applicable to the preparation of nitrocellulose-nitroglycerin double base propellent compositions in general, in a form which is extrudable, however, it will be illustrated by its application to a starting material which is a conventional double base propellent composition used to produce a propellant known as N–5. This propellant is now being widely used in jet actuated devices, such as rockets. N–5 propellant includes the following range of components and their equivalents.

Ingredient: Weight percent
Nitrocellulose _____ 44–60
Nitroglycerin _____ 28–47
Lead salicylate _____ 2–5
2-nitrodiphenylamine _____ 2
Diethyl phthalate _____ 3–11
Lead 2-ethylhexoate _____ 0–1.2

An operative composition of this propellant is as follows.

Component: Weight percent
Nitrocellulose _____ 50.0
Nitroglycerin _____ 34.9
Diethyl phthalate _____ 10.5
2-nitrodiphenylamine _____ 2.0
Lead 2-ethyl hexoate _____ 1.2
Lead salicylate _____ 1.2
Candelilla wax _____ 0.20

The process of the invention is illustrated by the following example: 2000 cc. of distilled water was mixed with 378 grams of 30% water-wet nitrocellulose to form a slurry. A paint paste was made by thoroughly mixing 2.72 grams of lead salicylate, 2.7 grams of lead 2-ethyl hexoate, 4.5 grams of 2-nitro diphenylamine, and .45 gram of candelilla wax. To the paint paste was added 79 grams of nitroglycerin desensitized with the 23.8 grams of diethyl phthalate. This mixture was aspirated into the nitrocellulose-water slurry at room temperature with continuous stirring. 200 cc. of 80/20 methyl ethyl ketone-toluene solvent were added with continuous mixing and the mixture aged for approximately two hours. The solvent was then distilled off rapidly at about 200° F. The mixture was filtered to remove excess water and the granular propellant dried in an oven.

The paste referred to above was made by thoroughly mixing and grinding the lead salicylate, lead 2-ethyl hexoate, 2-nitrodiphenylamine and candelilla wax and part of the diethyl phthalate on a paint mill. In this manner, the lead salicylate, which is the only component not miscible, was thoroughly dispersed into a stable suspension throughout the paste. Mixing of the paste with the desensitized nitroglycerin results in the formation of an oily protective coating of nitroglycerin and diethyl phthalate around the particles of lead salicylate. The liquid mixture was then added to the nitrocellulose-water slurry before addition of the solvent. This process was used for Examples 6, 7, and 8 of the table below, the results of the example given above being recorded as Example 6 in the table. The strands corresponding to these examples were well consolidated, uniform in diameter and had only a few surface cracks. The following table includes examples illustrating the invention.

| Example | Manufacturing conditions | | | | | | | | |
|---|---|---|---|---|---|---|---|---|---|
| | Pb₂EH | PbSal | Batch size, grams | Surface active agent, parts by weight | Solvent | | Water phase, gms. | Dist. | |
| | | | | | Type | Amt., gms. | | Time, hrs. | Max. temp., °F. |
| 1 | 2.4 | 3.8 | 300 | ABG (3) | ETAC | 1,050 | 2,700 | 10 | 185 |
| 2 | 1.6 | 2.5 | 600 | ABG (4) | ETAC | 2,100 | 5,400 | 2 | 180 |
| 3 | 7.2 | 1.8 | 100 | Kreelon 7D (2) | ETAC | 350 | 900 | 1 | 190 |
| 4 | 7.2 | 1.8 | 150 | Triton R-100 (2) | ETAC | 350 | 900 | 1 | 195 |
| 5 | 7.2 | 1.8 | 908 | PAA (5) | ETAC | 3,175 | 8,170 | 2 | 185 |
| 6 | 1.6 | 3.0 | 227 | ABG (3) | MEK-TOL | 200 | 2,040 | 3 | 202 |
| 7 | 1.6 | 3.0 | 227 | ABG (3) | MEK-TOL | 200 | 2,040 | 2½ | 201 |
| 8 | 1.6 | 2.0 | 454 | None | MEK-TOL | 800 | 4,080 | 3 and 1 | 75 and 193 |

| Example | Characteristics of granules | | | Extrusion of granules | | | |
|---|---|---|---|---|---|---|---|
| | Description | Avg. diam. in. ×10³ | Specific gravity | Temp., °F. | Pressure, p.s.i. | Strand consolidation | Strand surface |
| 1 | Flakes (30–40% H₂O) (part dried) | 45 | 1.40 | 135 | 3,800 | Poor | Swelling. |
| 2 | Spheres (30–40% H₂O) (part dried) | 15 | 1.40 | 135 | | Good | Cracks. |
| 3 | Spheres | 15 | 1.52 | 130 | 11,500 | | Rough. |
| 4 | Chunks | 25 | 1.51 | 140 | 6,700 | Good | Smooth. |
| 5 | Oblong spheres | 15 | 1.44 | 140 | 6,800 | Fair | Cracks. |
| 6 | Irregular clusters | 3 | | 140 | 5,000 | Good + | Slight cracks. |
| 7 | do | 3 | 1.52 | 140 | 3,000 | Fair | Do. |
| 8 | do | Large | | 140 | 4,900 | Satisfactory | Smooth. |

The various symbols used in the table are defined as follows:

Pb₂EH _____ Lead 2-ethyl hexoate.
PbSal _____ Lead salicylate.
ABG _____ Amber bone glue.
Kreelon 7D __ An anionic alkylated benzene sodium sulfonate.
Triton R-100 ____ An anionic alkyl-aryl sodium sulfonate.
PAA _____ Polyacrylic acid.
ETAC _____ Ethyl acetate.
MEK-TOL __ Methyl ethyl ketone-toluene.

The specific gravity of propellant samples was determined by the sink-float method in zinc chloride solutions. Specific gravity values of the solutions were varied in increments of 0.05 and the specific gravity of the propellant sample was approximated between these increments. Chemical analysis and strand burning rates were determined according to standard methods and procedures as given in NAVORD OD 9376 and 9377. Extrusion characteristics were obtained by visual observation of the strands and heels of the propellant that remained in the press. Qualitative ratings from poor, fair, good to satisfactory were used to describe the extrusions.

The above process is represented by the flow chart shown in FIG. 1. The process set forth in steps is as follows:

(1) A slurry of nitrocellulose in water is made with a preferred 9:1 ratio of water to nitrocellulose and the slurry agitated continuously;

(2) The nitroglycerin desensitized by part of the inert plasticizer, diethyl phthalate in this case, is mixed with a paint paste consisting of the ballistic modifiers lead 2-ethyl hexoate and lead salicylate, stabilizers, and the remainder of the inert plasticizer;

(3) The liquid mixture is formed in step 2 and introduced into the nitrocellulose-water slurry at room temperature;

(4) An immiscible solvent is added in an amount which may vary from about .5 to about 3.5 times the propellant mix by weight;

(5) The mixture is aged for approximately two hours;

(6) The solvent is distilled off rapidly;

(7) The mixture is filtered to remove excess water and the residue of granular powder is dried in an oven.

The granular particles formed are not smooth surfaced balls but are irregular shaped clusters of colloided powder such as the powder produced in Example 6 and shown in FIG. 2. It is to be noted that no hard surface or skin is formed on these clusters. This is in contrast to the product shown in FIG. 3 which was formed by using a conventional "solvent" process described above.

It will be noted by examination of FIG. 4, a cross-section of a grain made from the propellant produced in the above example, that the propellant consolidates readily into large grains.

A further advantage of the manner in which the lead compound ballistic modifiers are incorporated into the propellent mix is that uniform incorporation results. The lead salicylate is not miscibe with the sovent, presenting a serious problem of uniform incorporation into the propellant. The lead is slightly soluble in the water phase and also forms a precipitate that settles out during granular formation and distillation, resulting in reduced percentages of both lead 2-ethyl hexoate and lead salicylate in the final powder. Since even slight deviations of the percentage composition of these ballistic modifiers will vitiate the mesa and plateau effects of propellants, former processes cannot be used. By the formation of a paint paste of plasticizers, modifiers, stabilizers, and other ingredients, as described above, followed by the introduction therein of nitroglycerin, the lead compounds are thoroughly dispersed into a stable suspension throughout the paste, and accordingly, throughout the final product.

It was found that while surface active agents were not essential to the process, their use had some slight advantage in certain instances. Examples 1 to 4, inclusive, are illustrative of results obtained using surface active agents. Particle formation was satisfactory with all agents and was accomplished with concentrations ranging from 0.5% of polyacrylic acid to 4% amber bone blue.

An additional feature consists in external plasticization, the addition of nitroglycerin and the inert plasticizer to a water suspension of the granules. The importance of this feature is that it furnishes a simple method of adjusting upward the percentage of nitroglycerin and inert plasticizer in the finished powder.

Propellant compositions were made by the above described process substituting equivalent stabilizers and inert plasticizers in the propellent composition used above to illustrate the invention, with equivalent results. For example, it was found that the substitution of triacetin for diethyl phthalate and the substitution of ethyl centralite for 2-nitrodiphenylamine did not affect the results.

Ethyl acetate and an 80–20 weight ratio of methyl ethyl ketone-toluene were used as solvents. The 80–20 methyl ethyl ketone-toluene mixture was used in the majority of the runs since its properties are similar to those of ethyl acetate along with greater volatility. The ratio of solvent to propellant varied from 3.5:1 to 0.9:1. When a 3.5:1 ratio was used, the nitrocellulose and other soluble ingredients were completely dissolved in the solvent into a lacquer before granule formation. When the amount of solvent was reduced, it was found that granules would form, even in the absence of complete solution of ingredients. Solvent to propellant ratios of as low as 0.9:1 produced granular formation. The granules in these cases were not spherical in shape but were clusters having irregular surfaces, such as those shown in FIG. 2. Extrusions of these granules were just as successful as that of granules having spherical shapes. Addition to the water slurry of only enough solvent to give a 1:1 ratio of solvent to propellant, as in Example 6, does not produce a two-phase liquid system. A lacquer of the propellant ingredients in the solvent is not formed. Instead, the solvent only partially dissolves the nitrocellulose, which loses its fibrous character as the other propellent ingredients are absorbed. The granular particles formed are not smooth surfaced balls but are irregular shaped clusters of colloided powder. The fact that such a small ratio of solvent to propellent mix can be used is due to the order of addition of solvent to the propellent mix, that is, the addition of solvent after addition of water.

From the results set forth above of the described process, it is seen that a process has been provided by the invention for producing propellent compositions in extrudable form, which is safe in operation, is reproducible, and which does not substantially alter the percentage composition of the starting materials of the propellent composition.

Obviously, many modifications and variations of the present invention are possible in the light of the above teachings. It is therefore to be understood that within the scope of the appended claim the invention may be practiced otherwise than as specifically described.

What is claimed is:

The process of compounding in extrudable form propellent compositions consisting essentially of about 44 to about 60 percent of nitrocellulose, about 28 to about 47 percent of nitroglycerin, about 2 to about 5 percent of a material from the class consisting of lead salicylate and lead 2-ethyl hexoate, about 2 percent of 2-nitrodiphenylamine, and about 3 to about 11 percent of diethyl phthalate; said process consisting essentially of making a water slurry of the nitrocellulose consisting of about 9 parts of water to about 1 part of nitrocellulose; making a paint paste by grinding together a small amount of the diethyl phthalate, the lead salicylate and the 2-nitrodiphenylamine; adding the remainder of the diethyl phthalate to the nitroglycerin to desensitize it; adding the desensitized nitroglycerin to the paint paste to form a liquid mixture;

adding the liquid mixture to the nitrocellulose slurry with continuous stirring to form a propellent mixture; adding methyl ethyl ketone-toluene solvent to the propellent mixture in an amount from about .5 to about 3.5 parts by weight of propellent mixture; aging the mixture formed by addition of solvent to propellent mixture; and distilling off said solvent.

References Cited in the file of this patent

UNITED STATES PATENTS

| | | |
|---|---|---|
| 1,390,671 | Cope | Sept. 13, 1921 |
| 1,924,464 | Skilling et al. | Aug. 29, 1933 |
| 1,966,806 | Spurlin | July 17, 1934 |
| 2,628,561 | Sage et al. | Feb. 17, 1953 |